United States Patent [19]

Ferry

[11] Patent Number: 4,644,616

[45] Date of Patent: Feb. 24, 1987

[54] SAFETY BELT BUCKLE DEVICE WITH AUTOMATIC UNLOCKING

[75] Inventor: Jacques H. Ferry, Paris, France

[73] Assignee: Equipements Automobiles Marchall, Issy-Les-Moulineaux, France

[21] Appl. No.: 755,733

[22] Filed: Jul. 17, 1985

[30] Foreign Application Priority Data

Jul. 17, 1984 [FR] France ............................. 84 11301

[51] Int. Cl.$^4$ ..................... A44B 11/25; H01H 3/16
[52] U.S. Cl. .................................... 24/602; 24/603; 200/61.58 B
[58] Field of Search ............... 24/602, 603, 574, 447, 24/90 HA; 200/61.58 B; 307/10 SB

[56] References Cited

U.S. PATENT DOCUMENTS

| | | |
|---|---|---|
| 3,226,674 | 12/1965 | Eriksson ..................... 200/61.58 B |
| 3,670,119 | 6/1972 | Gebhardt et al. ............ 200/61.58 B |
| 3,760,135 | 9/1973 | Nevett ......................... 200/61.58 B |
| 3,897,081 | 7/1975 | Lewis ........................... 200/61.58 B |
| 3,963,090 | 6/1976 | Hollins ..................................... 24/603 |
| 3,994,049 | 11/1976 | Johansen et al. ....................... 24/602 |
| 4,014,080 | 3/1977 | Caradec .................................. 24/602 |
| 4,126,919 | 11/1978 | Lassche .................................. 24/602 |
| 4,162,715 | 7/1979 | Coulombe .............................. 24/602 |

Primary Examiner—Victor N. Sakran
Attorney, Agent, or Firm—Brisebois & Kruger

[57] ABSTRACT

The device comprises automatic unlocking means for a fastening member connected to the belt and actuating means for the unlocking which are sensitive to a parameter of the state of a movable structure in which the safety belt is installed. The automatic unlocking means comprise means for automatically exerting a force against elastic means on a triggering device. The means for automatically exerting a force comprise a metallic element capable of exerting a force when heated, and heating means for this metallic element.

10 Claims, 4 Drawing Figures

SAFETY BELT BUCKLE DEVICE WITH AUTOMATIC UNLOCKING

FIELD OF THE INVENTION

The invention relates to a safety belt buckle device comprising two parts one of which is formed as a casing and is attached to an anchorage point of a mobile structure, for example the structure of a motor vehicle, and the other of which comprises a fastening member and is connected to the belt, locking means being provided for ensuring locking of the fastening member in the casing. Such a device, also includes automatic unlocking means for the fastening device, and means for the control of the said automatic unlocking means which are sensitive to a parameter of the state of the mobile structure and are capable of actuating the unlocking and of releasing the fastening member after a change in the above-mentioned parameter of the state of the mobile structure has been detected. The locking means on the casing comprise a triggering device actuated in the locking direction by elastic means, whilst the automatic unlocking means comprise means for automatically exerting a force on the triggering device against the elastic means.

The parameter of the state of the mobile structure to which the automatic unlocking means are sensitive is generally the deceleration to which the mobile structure is subjected.

Thus the automatic unlocking means allow the belt buckle to be opened a certain time after a shock producing a deceleration of a sufficient amplitude. The user of the belt (the driver or passenger of the vehicle) then finds himself automatically released: he can therefore free himself more easily and more rapidly if he is conscious and capable of doing so or, if this is not the case, a third person can more readily assist the user released from his belt.

PRIOR ART

Various automatic unlocking means have been proposed to date but are relatively bulky and expensive.

OBJECTS OF THE INVENTION

It is an object of the invention to provide a safety belt buckle device of the type defined above comprising automatic unlocking means which should be small in size and relatively inexpensive. It is, moreover desired that the automatic unlocking means should be robust and reliable in operation.

SUMMARY OF THE INVENTION

In accordance with the invention, a safety belt buckle device of the kind defined above, is characterised in that the means for automatically exerting a force on the triggering device against the elastic means comprise at least one metallic element capable of exerting a force when it is heated, one part of this metallic element being joined to the casing, whilst the other part of this element is connected to the triggering device, and in that means are provided for heating the metallic element, the means of actuation being capable of causing the heating means to operate and to produce the automatic unlocking.

The metallic element can be made of a metal or a metallic alloy "endowed with memory" such as the alloy marketed under the name of "Tinel" by the RAY-CHEM Company.

In that case, the metallic element can be constituted by a wire, one end of this wire being connected to the casing whilst the other end is connected to the triggering device, the heating means comprising means for passing an electric current through the wire to heat it by the Joule effect. The wire can be disposed in a chamber defined by two cylinder half shells.

According to another possibility, the metallic element made of a memory metal is constituted by a plate whose ends are clamped on the casing and whose central portion is joined to the triggering device, the plate being capable of developing a force along a direction substantially orthogonal to its median plane.

In another embodiment, the metallic element is constituted by a bimetallic strip, the heating means being formed by means for supplying an electric current which directly passes through this bimetallic strip.

The actuating means can be subjected to a time lag. The time lag between the moment when the variation of the parameter occurs and the moment when the unlocking is actuated, is of the order of 1 to 8 seconds.

The actuating means sensitive to a parameter of the state of the moving structure generally comprise means for detecting a shock; advantageously, these shock detection means are combined with means for detecting motion of the mobile structure, of the vehicle in particular, so that the delayed means actuating the unlocking of the belt buckle can only be triggered after the vehicle has stopped.

These actuating means which are sensitive to a parameter of the state of the vehicle may comprise delayed means for actuating the unlocking of the buckle which can be actuated by the breaking of continuity at the ignition switch of the engine.

A display light may be provided for making it possible to control the proper working of the automatic unlocking device.

Advantageously, the parts of the automatic unlocking means are otherwise, as a whole, the same as those of manual unlocking means.

BRIEF DESCRIPTION OF THE DRAWINGS

Apart from the arrangements set out above, the invention consists of certain other features which will be discussed in greater detail below, relating to specific embodiments described with reference to the attached drawings but which are in no way restrictive.

DESCRIPTION OF THE PREFERRED EMBODIMENT

Figure 1:
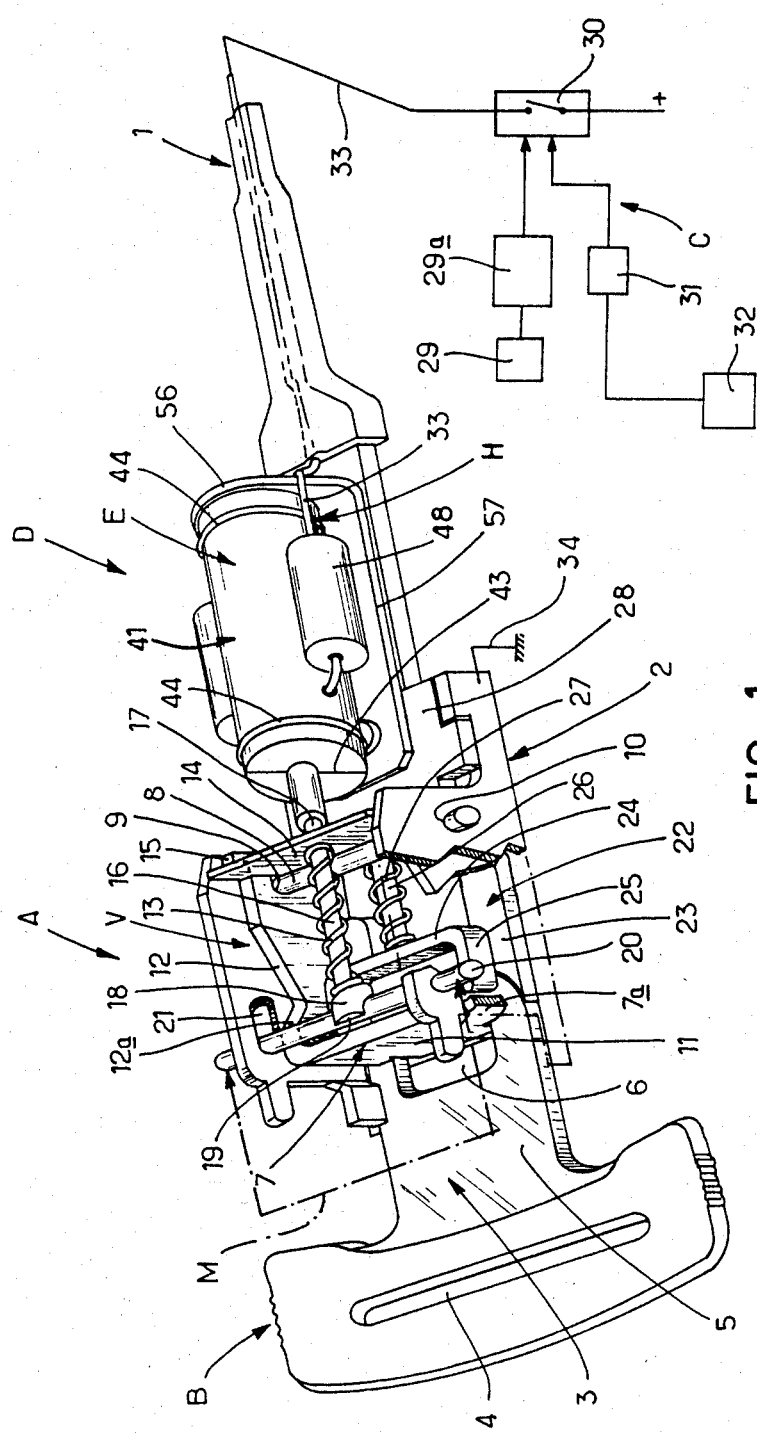
FIG. 1 of these drawings is a partially cut away perspective of a safety belt buckle device according to the invention.
Figure 2:
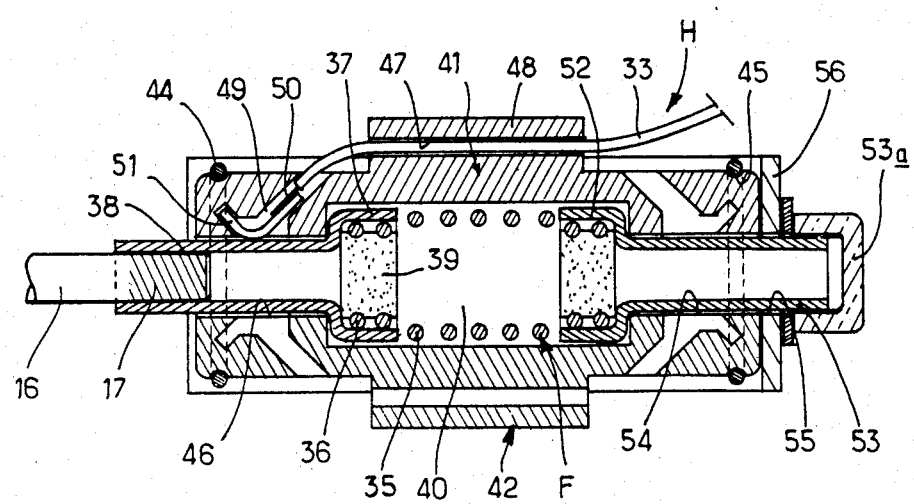
FIG. 2 is a partial longitudinal cross-section of the device of FIG. 1 at the means for exerting a force to produce unlocking.

Referring to FIGS. 1 and 2 of the drawings, a safety belt buckle device may be seen comprising two components A, B. One, A, of these components is formed as a casing and is attached by a metallic braid 1 or any other sufficiently strong connecting element to an anchorage point, not shown, of a moving structure which, in the example described, is the structure of a motor vehicle.

Component A, which will be described in greater detail below, comprises an open-topped metallic channel-shaped frame 2 having in its concavity locking means V; this frame 2 constitutes in some way the casing or receptacle. The whole of this frame 2 and all the components mounted on it are surrounded by a shell or case made of a plastic material which is not shown in the drawings.

The other or clasp component B of the buckle device comprises a fastening member 3 intended to be connected to the safety belt (not shown) which passes in a transverse closed slot 4 provided in member 3. This member 3 may comprise a metallic plate 5 provided, at its end which engages part 2, with an opening 6 having a closed, substantially rectangular contour constituting a kind of clasp. The width of the plate 5, at its end provided with the belt-receiving slot 4 is greater than the part having the opening 6 so that the plate 5, viewed in plan, resembles a T-shape with the slot 4 in the upper horizontal crossbar of this T and the opening 6 towards the lower part of the vertical stem of the T.

The locking means V provided in the component A are arranged for instance, as follows. They comprise a locking element 7 constituting a bolt having a general channel shape, the concavity of this channel being turned away from the slot 4, that is to say, towards the braid connecting element 1. This locking element 7 is articulated on the frame 2 by means of a transverse pivot pin 8 passing through a hole 9 provided towards the end of each arm of element 7 and a hole 10 provided in each side of frame 2.

The base of the channel-forming element 7 is provided in its lower portion with a projection 11 forming the bolt proper, situated in the plane of the base of the channel, this plane being substantially orthogonal to the bottom of the frame 2 and plate 5. The width of projection 11 is less than that of the locking element 7, this width being such that this projection can enter, with a small clearance, into the opening 6 of plate 5.

The upper longitudinal edges of the sides of the locking element 7 each comprise an upwardly open asymmetrical cut-out 12. The rear side of the cut-out 12, i.e. the side extending towards the pin 8, slopes less in relation to the plane of plate 5 than does the front side 12a of this cut-out. This side 12a is substantially in the form of a retaining catch.

The rocking of the locking element 7 around pin 8 is actuated by an elastic triggering system comprising a helical spring 13 bearing at one end against a plate 14 itself mounted to abut against shoulders such as 15 provided at the ends of the upper edges of the locking element 7. Spring 13 is mounted around a sliding pin 16, made for instance, of a plastic material, which passes through an opening provided in the plate 14 so as to have its end 17 projecting beyond the other side of this plate. At its other end, the pin 16 comprises a head 18 of larger diameter against which bears the other end of the spring 13. This head 18 is provided, on the side facing away from spring 13, with a transverse cut-out 19 open towards the front and capable of receiving the median portion of a metallic transverse pin 20 which is substantially orthogonal to the pin 16.

This pin 20 passes through two oblong openings such as 21 provided towards the top of the sides of frame 2, at the end of these sides facing clasp component B. The median longitudinal direction of the openings 21 is parallel to the median plane of the base of the frame 2. The pin 20, whose length is greater than the width of the frame 2 projects to either side through openings 21 of each of the sides of the frame 2. This pin 20 can slide in the openings 21 between two extreme positions; in the position represented in FIG. 1, the pin 20 bears against the front end of the openings 21 under the action of spring 13. If a sufficient force is exerted on the pin 20 or on the pin 16 to overcome the action of spring 13, the pin 20 may be pushed back until it comes into contact with the rear ends of openings 21. The various components are arranged in such a way that when the pin 20 occupies the position shown in FIG. 1, that is to say, it is in abutment against the front ends (i.e. the ends facing the clasp component B) of openings 21, the pin 20 bears against the upper edge of element 7 outside cut-out 12. On the other hand, when the pin 20 is pushed back towards the rear ends of openings 21 (i.e. the ends nearer the braid connection element 1) the pin 20 is located longitudinally substantially at the level of the trough of the cut-out 12.

A slide 22, for instance of a plastic material, is mounted for displacement against the bottom of frame 2. This slide comprises two lateral skids 23 which are joined on their upper side to a crossbar 24 extended towards the front on either side by sides 25, capable of coming on either side of projection 11 below the components such as 7a of the element 7 which join the transverse back to the sides of this element. When the plate 5 of clasp component B is inserted in the frame by sliding against the bottom of this frame, the end of this plate comes to bear against the skids 22 below the ends of the sides 25 of crossbar 24. In its central portion the crossbar 24 is fixed to a guide pin 26, for instance moulded integrally with its crossbar 24. The pin 26 is parallel with the pin 16 and extends towards the braid connection element 1. A helical compression spring 27 is engaged on this pin 26 so that one end of the spring 27 bears against the crossbar 24 whilst the other end (not shown in the drawings) of spring 27 bears against a plate 28 integral with the frame 2. A cut-out or channel, not shown in the drawings, is formed in the plate 14 to allow this spring 27 free passage. Stop means, not shown in the drawings, limit the forward travel that is to say towards clasp component B, of the skids 22 under the action of spring 27.

Manual unlocking means, outlined by dot dashed lines M, are provided on the component A or the casing to allow the fastening member formed by plate 5 to be released. For instance, these manual means M allow a thrust to be exerted at the two ends of the pin 20 to bring it back towards the rear of the openings 21.

The functioning of this safety belt buckle device known in itself will be briefly recalled.

Starting with the locked position of FIG. 1, unlocking is obtained by causing the pin 20 to move back against the spring 13. Since the pin 20 is at the level of the troughs of the cut-outs 12, the element 7 pivots upwards around its pivot pin 8 until the bottom of cut-outs 12 come to bear against pin 20. This pivoting is produced by the spring 13 exerting a thrust on the plate 14 above pin 8 which creates a pivoting motion straining the element 7 into rotation around the pin 8, in a clockwise direction if one is looking at FIG. 1.

The projection 11 of the element 7 rises and completely withdraws from the opening 6 in the plate 5 thus freeing it to be pushed back by the skids 22 under the action of the spring 27. The sides 25 of the crossbar 24 then engage below the components 7a.

The pin 20 then bears longitudinally against the sides 12a of the substantially notch-shaped cut-out 12 so that when the thrust force exerted on the pin 20 against the spring 13 is relaxed, the steep notch sides 12a retain the pin 20 at the rear portion of openings 21, in spite of the action of the spring 13.

To lock the two components A and B, the plate 5 is inserted slidably into the frame or casing 2 against the end of this frame. This insertion is possible because the projection 11 is already raised. Operating in this way, the skids 22 are pushed back against the action of spring 27. In the case of a sufficient rearward motion of the skids 22, the rear portion of these skids will come to bear against the bottom portion (not visible in the drawings) of the plate 14 which will produce a rocking motion of this plate 14 and of the element 7 joined to this plate 14, around this pin 8, in an anti-clockwise direction if one is looking at FIG. 1.

Pin 20 will thus be released from the notch sides 12a and the spring 13 will push this pin 20 sharply against the front end of openings 21, so the pin 20 abuts the upper edge of the now lowered element 7. Because of this downward movement of the element 7, the projection 11 enters the opening 6 in the plate 5. The portion of the plate 5 situated beyond the projection 11 in the frame 2 (this portion not being visible in the drawings) is maintained in bearing contact against the projection 11 without any clearance, because of the thrust of the skids 22.

These facts having been recalled, the invention can now be more readily understood.

The device in accordance with the invention comprises automatic unlocking means D for the fastening or clasp member 3 and the time delay means C actuating the unlocking means D. The time delay actuating means C are sensitive to a parameter of the state of the motor vehicle fitted with the safety belt buckle device and are capable of actuating the automatic unlocking of fastening member 3 in relation to casing 2, after a change of sufficient amplitude has been detected in the above-mentioned parameter of the vehicle.

The actuating means C sensitive to the state of the vehicle may comprise an accelerometer or shock detector means 29, schematically represented in FIG. 1, capable of triggering the timing means 30, also represented schematically, with a view to commanding the unlocking of the fastening member 3 at the end of a predetermined period after a shock whose intensity has exceeded the triggering threshold of the detecting means 29.

The shock detector means 29 can be constituted by any conventional shock detector device, for instance, a device with an inertia block capable of closing or opening an electric contact when the deceleration (or acceleration) to which this device is subjected exceeds a predetermined value, for instance 9g (g being the acceleration due to gravity).

One may combine with the shock detector 29, a motion detector 29a mounted in series with the shock detector 29. This motion detector 29a will not allow a triggering signal deriving from the shock detector to pass, until the vehicle has stopped. Thus the automatic unlocking can only occur after the vehicle has stopped which, in the case of successive multiple shocks, (for instance, a fall into a ravine) avoid untimely premature triggering of the automatic unlocking action.

The time delay means 30 may be constituted by a conventional time delay relay triggered by detection means 29, this relay being capable of closing (or opening) one or several electric contacts at the end of a predetermined (adjustable) time interval, for triggering the signal provided by the means 29.

The above-mentioned actuated time delay means C, sensitive to a parameter of the state of the vehicle may comprise schematically illustrated contact means 31 actuated by the ignition switch 32 of the vehicle. When the ignition switch 32 is turned off, (to stop the vehicle engine), the contact means 31 are capable of forwarding a triggering signal to the time delay means 30 which, after a certain time, actuate the automatic unlocking of the fastening member 3. It should be noted that means 31 sensitive to the breaking of contact at the ignition switch 32 are preferably used in combination with the shock detector means 29; however, means C sensitive to the state of the vehicle could comprise either only a shock detector 29, or only means 31 sensitive to the breaking of contact at the ignition switch.

The time delay introduced by means 30 can be of the order of 1 to 8 seconds.

As has been seen above, the locking means V comprise on the side of the frame or casing 2, a rectilinear displacement device comprising the pin 20, the spring 13 and the pin 16, actuated in the locking direction by the spring 13 forming the elastic means.

The automatic unlocking means D comprise means E (shown in more detail in FIG. 2) for automatically exerting a force against the elastic means 13 of the triggering device, and more particularly on the pin 16.

Means E may comprise at least one metallic element F (FIGS. 2 and 4) capable of deformation when heated, and also heating means H to heat this metallic element when put into operation by the timing means 30.

The heating means H advantageously comprise means for supplying an electric current comprising (a) a conductor 33 connected to the +pole (FIG. 1) of a direct current voltage source via an electric contact whose closure is actuated by the timing means 30 and (b) a connection 34 to earth, itself connected to the −terminal of the direct current source.

Advantageously, the heating of force exerting means E is ensured by the Joule effect, the electric current directly passing through means E for producing the heating action.

In the embodiment of FIGS. 1 and 2, the metallic element F is constituted by a wire 35 of a metal endowed with memory. The memory endowed metal is known in itself and may be constituted by a ternary alloy. One example of a memory metal which is commercially available is that known under the name of "Tinel" marketed by the RAYCHEM Company.

In the case of a helical coil element, such as the element 35 of FIG. 2, the initial heated state of this element corresponds to contiguous turns of the helix. When the coil element 35 cools to the ambient temperature, the helical turns are interspaced from each other as shown in FIG. 2. If the element 35 is heated by the Joule effect it reassumes its initial state, that is to say, the turns again become contiguous; the two axial ends of this element therefore come nearer to each other developing an axial force.

It is clear that instead of a helically wound wire 35, one could use an elongated rectilinear wire.

As may be seen in FIG. 2, the helix formed by element 35 is substantially coaxial with the pin 16. The end 36 of this helix nearer the pin 16 is joined to the latter for translation therewith. This connection is obtained for instance, by clamping the two end turns within an electrically conductive metallic sleeve 37, which is provided, at its end nearer the pin 16, with a smaller diameter cylindrical extension 38. The clamping of the end 36 in the sleeve 37 may be obtained by any appropriate means, in particular by means of an insulating plug 39 mounted within the turns of the coil 35.

The end of the extension 38 nearer the pin 16 is joined in translation to it by screwing (FIG. 2) of a thread on the internal wall of the extension 38 and a corresponding thread on the external surface of the end part 17 of the pin 16.

The helical coil 35 is mounted within a cylindrical chamber 40 delimited by two electrically insulating half cylinder shells 41, 42, made of a moulded plastic material, maintained against each other along a diametral mating plane 43 (FIG. 1). The two shells 41, 42 are kept assembled on each other by means of elastic rings such as 44, provided towards each of the ends of these half cylinder shells and mounted in grooves 45 on the shells.

A cylindrical duct 46 (FIG. 2), formed by the junction of the two half-cylindrical channels provided in each shell causes the chamber 40 to open towards the pin 16. The extension 38 of the sleeve 37 is slidably mounted in this duct 46. The connecting electric conductor 33 passes in a longitudinal conduit 47 provided in a cylindrical portion 48 projecting from the surface of one said shell 41, the end of this conductor 33 entering a recess 49 opening on the cylindrical wall of the shell 41. The end of the conductor 33 is bared at 50 and connected electrically, for instance by soldering, to a strip 51 for example of a bronze alloy. This strip 51 is substantially bent into a V shape as may be seen in FIG. 2, so that its rounded convex portion constitutes a sliding contact bearing on the external surface of the extension 38. Thus strip 51 forms a sliding electric contact for passing the electric current through coil 35.

The other end of the helical coil 35 is connected to the frame 2 (or casing) by being clamped, for instance at the level of the two end turns, in a metallic sleeve 52 similar to the sleeve 37, but orientated in the opposite direction and situated at the other end of the chamber 40. This sleeve 52 comprises a smaller diameter tubular extension 53 passing through a duct 54 in the shells; extension 53 projects axially in relation to the shells and passes through an opening 55 in one end 56 (which is substantially orthogonal to the median plane of the bottom of the frame 2) of a metallic bracket 57 rigidly joined to the frame 2. The extension 53 is fixed, with a nut 53a in particular to the side 56. The sleeve 52, extension 53 and bracket 57 ensure the electric earthing of the end of the element 35 clamped in the sleeve 52. Sleeves 37 and 52, and extensions 38 and 53 are all coaxial with chamber 40.

The two shells 41 and 42 are preferably identical, with a view to simplifying the moulding operations, which explains the presence of housings similar to the recess 49 at the two ends of each one of the shells, as well as the presence of a duct in the lower shell 42 of FIG. 2 similar to duct 47 whilst this duct is not used to receive an electric conductor.

Figure 3:
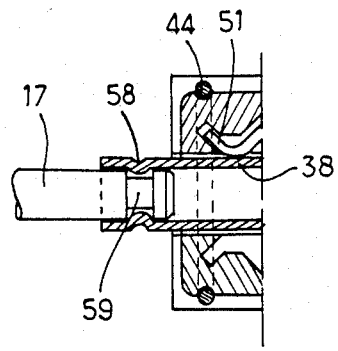
FIG. 3 is a detail of a variant of the embodiment of FIG. 2.

FIG. 3 illustrates a variant in which the connection in translation of the extension 38 and the end 17 of the pin 16 is obtained by a crimped part 58 of this sleeve 38, around a groove 59 provided on the end 17 of the pin 16.

This being the case, the functioning of the automatic unlocking means D is as follows.

In the case of a shock of sufficient intensity, and also stopping of the vehicle, the shock detector 29 and motion detector 29a (FIG. 1) trigger the timing means 30 which, at the end of a certain period after the shock, close an electric contact to connect the conductor 33 to the +terminal. The electric current then flows through the conductor 33, the sliding contact 51 (FIG. 2), the extension 38, the sleeve 37, the helical coil 35, the sleeve 52, the extension 53 and then the bracket 57 to complete the circuit by way of earth.

The electric current passing through coil 35 produces heating, by the Joule effect, of this element made of a "memory endowed metal". This helical element 35 will therefore heat up to reassume its initial state in which the helical turns are contiguous. The coil 35 will therefore develop an axial force on the sleeve 37 and will bring this sleeve nearer the other sleeve 52 thus transmitting a force to the pin 16 which is thus displaced rightwardly in FIGS. 1 and 2 to produce, as explained above, raising of the projection 11 (FIG. 1) and the automatic unlocking of the clasp member 3.

A similar functioning is obtained if the time delay means 30 are triggered, no longer by the shock detector 29, but by the means 31 (FIG. 1) responsive to the breaking of contact at the ignition switch 32.

Figure 4:
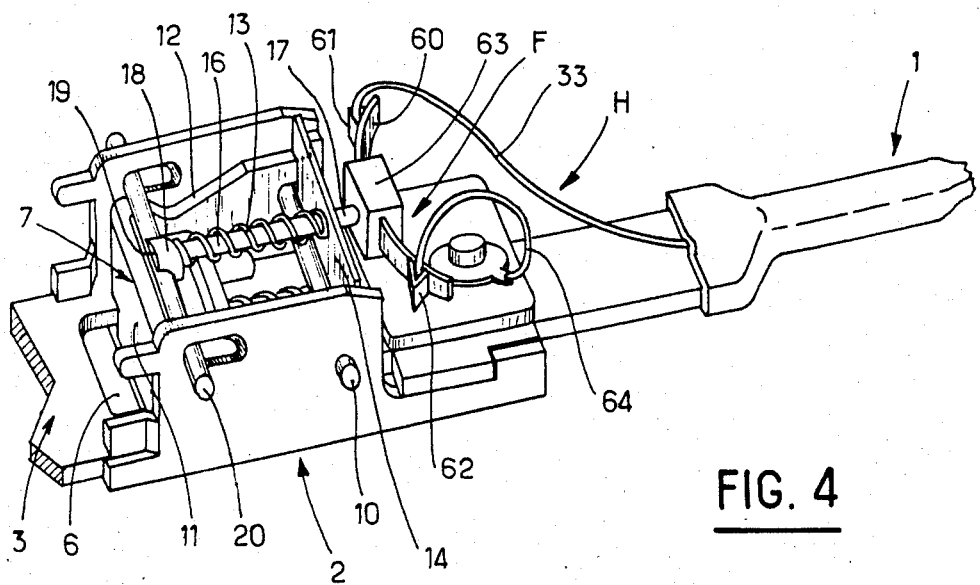
FIG. 4 is a partial perspective of a safety belt buckle device fitted with another type of metallic element capable of exerting the force for the automatic unlocking.

FIG. 4 illustrates a variant of the embodiment wherein the metallic deformable element F is a transverse strip or plate 60 whose median plane is substantially orthogonal to the bottom of the frame 2. This plate 60 is fixed, towards its two ends, on two insulating supports 61, 62 which are integral with the frame 2. The central portion of the strip 60 is joined, for instance by an insulating block 63, to the pin 16 of the safety belt buckle device. One end of the plate 60 is connected electrically to the connecting conductor 33, whilst the other end of this plate 60 is connected electrically to earth by a connecting conductor 64.

The plate 60 may be constituted by a bimetallic strip or by a metal plate endowed with memory. The other elements of the device shown in FIG. 4, similar to the elements already described, have been designated by the same reference numerals.

The functioning of the device of FIG. 4 is similar to the one described with reference to FIGS. 1 and 2. At a certain time interval after a sufficient shock has occurred or after the breaking of contact at the ignition switch has been actuated, the plate 60 experiences an electric current which heats it. This plate, which has a convex shape with its convexity towards the fastening member 3 (see FIG. 4), reassumes a substantially flat shape, and thereby exerts a rightward pull on the pin 16, as viewed in FIG. 4. This pull unlocks the device. In the case where the plate 60 is made of a metal endowed with memory, it is possible that for adequate heating produced by the Joule effect even a current of the order of 30 amps would be insufficient. Provision may thus be made for indirect heating of this plate 60 by means of a heating resistor wound around the plate. The ends of this heating resistor would then be connected to the conductors 33 and 64.

With the device of the present invention, automatic triggering of the unlocking of the safety belt at a certain period after a shock allows any occupants, who are still conscious and fit, to free themselves more rapidly from the vehicle, and allows unconscious occupants to be more rapidly released.

Apart from this situation linked to an accident, automatic unlocking of the belt after the ignition contact of the engine has been cut represents a convenience factor for the driver and the passengers of the vehicle who are automatically released from their safety belts after the engine has stopped normally.

The source of the current supply for the automatic unlocking may be constituted by an additional autonomous leakproof battery which takes over from the vehicle battery in the very rare circumstances of the vehicle battery becoming damaged in an impact.

Because of the presence of conductor 33, which is necessary for supplying the electric current to the safety belt, provision may be made for a display light on the dash-board of the vehicle to facilitate checking of the proper working state of the system. For instance, the check of this working state may involve pressing a push button to cause current to flow in the connecting conductor 33 and to illuminate the light connected in series with this conductor 33; a failure of the light to light up will indicate that conductor 33 has been severed.

I claim:

1. In a safety belt buckle device comprising first and second components, said first component comprising a fastening member to be attached to a safety belt and the second component being adapted to be fixed to an anchorage point of a movable structure; said second component including locking means for locking the fastening member in the casing, automatic unlocking means for releasing the said fastening member, actuating means for the automatic unlocking means, and means responsive to a parameter of the state of said movable structure and capable of actuating the unlocking means and hence of releasing the fastening member after detection of a change of said parameter of the state of said movable structure; said locking means comprising, on the casing, a triggering device, and elastic means actuating said triggering device in the locking direction; and said automatic unlocking means comprising means for automatically exerting a force against said elastic means to actuate the triggering device, the improvement wherein:
(a) the means for automatically exerting a force comprise metallic means capable of exerting a force when heated, said metallic means having a first part joined to said casing and a second part joined to the triggering device, and
(b) heating means are provided for heating the metallic element, said actuating means being capable of energising the heating means to produce the automatic unlocking.

2. A device according to claim 1, wherein the metallic element is one of a metal and a metallic alloy, and is endowed with a thermal memory.

3. A device according to claim 2, wherein the metallic element is a plate of a metal endowed with a thermal memory, said plate having opposite ends clamped to said casing and a central portion joined to the triggering device, said plate further being capable of developing a force along a direction substantially orthogonal to its median plane.

4. A device according to claim 1, wherein the metallic element is constituted by a bimetallic strip, said heating means comprising means to pass the electric current directly through said bimetallic strip.

5. A device according to claim 1, wherein the actuating means are given a time delay between the moment when the variation in said parameter occurs and the moment when the unlocking is commanded, said time delay being from about 1 to about 8 seconds.

6. A device according to claim 1, wherein the movable structure is a vehicle, and the actuating means responsive to said parameter of the state of the movable structure comprise shock detector means and means for detecting movement of the movable structure, said parameter responsive means being effective to operate the time delayed actuating means for unlocking the belt buckle only after the vehicle has stopped.

7. A device according to claim 1, wherein said movable structure is an engine-powered vehicle, and wherein said actuating means which are responsive to said parameter of the state of the movable structure, comprise time delayed means for commanding the unlocking of the buckle and operative so as to be actuated by the breaking of the ignition circuit of the engine of the vehicle.

8. A device according to claim 1, wherein said automatic unlocking means is substantially identical to conventional manual unlocking means.

9. In a safety belt buckle device comprising first and second components, said first component comprising a fastening member to be attached to a safety belt and the second component being adapted to be fixed to an anchorage point of a movable structure; said second component including locking means for locking the fastening member in a casing, automatic unlocking means for releasing the fastening member, actuating means for the automatic unlocking means, and means responsive to a parameter of the state of said movable structure and capable of actuating the unlocking means and therefore of releasing the fastening member after detection of a change of said parameter of the state of said movable structure; said locking means comprising, on the casing, a triggering device, and elastic means actuating said triggering device in the locking direction; and said automatic unlocking means comprising means for automatically exerting a force against said elastic means to actuate the triggering device, the improvement wherein:
the means for automatically exerting a force comprises metallic means for exerting a force when heated, said metallic means having a first part joined to said casing and a seond part joined to the triggering device,
heating means for heating the metallic means,
said actuating means comprising means for energizing the heating means to produce the automatic unlocking, and wherein,
the metallic means comprises a wire of a metal endowed with a thermal memory, said wire having a first end connected to the casing and a second end connected to the triggering device, and
said heating means comprises means for supplying an electric current to pass along said wire for heating the wire by the Joule effect.

10. A device according to claim 9, including two half cylindrical shells defining a chamber in which the wire is disposed.

* * * * *